United States Patent
Ogiwara et al.

(10) Patent No.: US 10,434,871 B2
(45) Date of Patent: Oct. 8, 2019

(54) CLOSED TANK SYSTEM

(71) Applicant: HONDA MOTOR CO., LTD., Tokyo (JP)

(72) Inventors: Naoki Ogiwara, Wako (JP); Hiroaki Watanabe, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/830,534

(22) Filed: Dec. 4, 2017

(65) Prior Publication Data

US 2018/0154767 A1  Jun. 7, 2018

(30) Foreign Application Priority Data

Dec. 5, 2016  (JP) .................................. 2016-236267

(51) Int. Cl.
  *B60K 15/035*  (2006.01)
  *F16K 24/04*  (2006.01)
  (Continued)

(52) U.S. Cl.
  CPC ...... *B60K 15/03519* (2013.01); *B60K 15/035* (2013.01); *B60K 15/03504* (2013.01);
  (Continued)

(58) Field of Classification Search
  CPC ......... Y10T 137/8342; Y10T 137/7297; F16K 24/04; B60K 15/03519; B60K 15/035;
  (Continued)

(56) References Cited

U.S. PATENT DOCUMENTS 4,535,627 A * 8/1985 Prost ...................... G01G 17/00
                                                         367/908
5,072,615 A * 12/1991 Nawrocki ................ G01C 9/18
                                                         33/366.14
(Continued)

FOREIGN PATENT DOCUMENTS

JP    H05-126004 A    5/1993
JP    2015-081528 A   4/2015

OTHER PUBLICATIONS

Japanese Office Action with English Translation dated Jul. 31, 2018, 6 pages.

*Primary Examiner* — Atif H Chaudry
(74) *Attorney, Agent, or Firm* — Rankin, Hill & Clark LLP

(57) ABSTRACT

A closed tank system includes: a fuel tank; a canister adapted to adsorb evaporative fuel generated in the fuel tank; a fill-up limiting valve provided inside the fuel tank so as to be communicated with the evaporative fuel discharge passage and adapted to operate to close the evaporative fuel discharge passage when a fuel level reaches a predetermined full tank liquid level; a shut-off valve adapted to operate to open or close the evaporative fuel discharge passage; a fuel remaining amount sensor adapted to detect a remaining amount of fuel; and a hardware processor that causes a control section to carry out control for allowing the shut-off valve to be opened or closed. The hardware processor causes the control section to inhibit the control for allowing the shut-off valve to be opened when an engine is in operation and the detected remaining amount of fuel exceeds a predetermined threshold.

4 Claims, 4 Drawing Sheets

(51) Int. Cl.
*F02M 25/08* (2006.01)
*B60K 15/03* (2006.01)
*B60K 15/04* (2006.01)
*B67D 7/04* (2010.01)

(52) U.S. Cl.
CPC .............. *B60K 15/04* (2013.01); *B67D 7/048* (2013.01); *B67D 7/0492* (2013.01); *F02M 25/089* (2013.01); *F02M 25/0809* (2013.01); *F02M 25/0836* (2013.01); *F16K 24/04* (2013.01); *B60K 2015/0319* (2013.01); *B60K 2015/03217* (2013.01); *B60K 2015/03289* (2013.01); *B60K 2015/03302* (2013.01); *B60K 2015/03514* (2013.01); *B60K 2015/03552* (2013.01); *B60K 2015/03571* (2013.01); *F02M 2025/0845* (2013.01); *F02M 2025/0863* (2013.01); *Y10T 137/7297* (2015.04); *Y10T 137/8342* (2015.04)

(58) Field of Classification Search
CPC ........... B60K 2015/03514; B60K 2015/03217; B60K 2015/0319; B60K 2015/03302; B60K 2015/03571; F02M 25/0836; F02M 25/089; F02M 25/0809; F02M 2025/0845
See application file for complete search history.

(56) References Cited

U.S. PATENT DOCUMENTS

| | | | | |
|---|---|---|---|---|
| 5,138,559 | A | * | 8/1992 | Kuehl ................. G01F 23/0076 340/618 |
| 5,913,294 | A | * | 6/1999 | Takahashi ............. F02B 61/045 123/198 DB |
| 2012/0186333 | A1 | * | 7/2012 | Nishimura ......... F02M 25/0809 73/40.5 R |

* cited by examiner

CLOSED TANK SYSTEM

CROSS-REFERENCE TO RELATED APPLICATION

This application is based upon and claims priority from the Japanese Patent Application No. 2016-236267, filed on Dec. 5, 2016, the entire contents of which are incorporated herein by reference.

BACKGROUND OF THE INVENTION

1. Field of the Invention

The present invention relates to a closed tank system in which a shut-off valve is provided in a communication passage between a fuel tank that stores fuel to be supplied to an internal-combustion engine mounted on a vehicle, and a canister that adsorbs evaporative fuel generated in the fuel tank.

2. Description of the Related Art

For example, Patent document 1 (Japanese Unexamined Patent Application Publication No. 2015-081528) discloses a closed tank system in which a shut-off valve is provided in a communication passage between a fuel tank which stores fuel to be supplied to an internal-combustion engine mounted on a vehicle, and a canister which adsorbs evaporative fuel generated in the fuel tank. The closed tank system disclosed in Patent document 1 is adapted to carry out control for allowing the shut-off valve to be opened during oil supply, or when the internal-combustion engine is in operation and a tank inner pressure exceeds a predetermined threshold. Such a closed tank system is generally used in a vehicle such as a plug-in hybrid car in which an internal-combustion engine is less frequently used.

The fuel tank composing the closed tank system disclosed in Patent document 1 is provided with a member called a fill-up limiting valve. The fill-up limiting valve is disposed to lie in the communication passage between the fuel tank and the shut-off valve. The fill-up limiting valve is adapted to operate to close the valve by allowing a float to float on the fuel when a fuel level reaches a predetermined full tank liquid level.

Incidentally, in scenes of refueling for the fuel tank, supplemental refueling is additionally carried out in some cases after the fuel level reaches the full tank liquid level. Where such supplemental refueling is carried out, there is a risk that, when control for allowing the shut-off valve to be opened is carried out, fuel in liquid form reaches the canister through the shut-off valve. This will be explained below. When the supplemental refueling is carried out, the fuel level reaches an over-full tank liquid level that exceeds the full tank liquid level. This allows the fill-up limiting valve to be brought into a state wetted with the fuel. When control for allowing the shut-off valve to be opened is carried out in this state, a differential pressure is generated between an upstream side (high pressure side in the fuel tank) and a downstream side (low pressure side in the communication passage) with a valve part of the fill-up limiting valve as a boundary. Accordingly, the differential pressure causes the fuel level in the fill-up limiting valve to rise. At this time, movement of the float allows the valve part of the fill-up limiting valve to start closing. However, the movement of the float is preceded by the fact that the differential pressure causes the fuel to be sucked out of the fuel tank to the downstream side (low pressure side in the communication passage).

As a result, when the control for allowing the shut-off valve to be opened is carried out where the supplemental refueling causes the fuel level to reach the over-full tank liquid level, there has been a risk that the fuel in liquid form reaches the canister through the shut-off valve.

The present invention has therefore been made in view of the above actual circumstances, and an object of the invention is to provide a closed tank system capable of preventing fuel in liquid form from reaching a canister through a shut-off valve.

SUMMARY OF THE INVENTION

In order to achieve the above object, according to an aspect of the present invention, a closed tank system reflecting one aspect of the present invention includes: a fuel tank that is adapted to store fuel to be supplied to an internal-combustion engine mounted on a vehicle; a canister that is connected via a communication passage to the fuel tank and adapted to adsorb evaporative fuel generated in the fuel tank; a fill-up limiting valve that is provided in a chamber of the fuel tank so as to be communicated with the communication passage and adapted to operate to close the communication passage by allowing a float to float on the fuel when a fuel level reaches a predetermined full tank liquid level; a shut-off valve that is provided on a downstream side of the fill-up limiting valve in the communication passage when seen from the fuel tank and adapted to operate to open or close the communication passage; a fuel remaining amount detector that is adapted to detect a remaining amount of fuel stored in the fuel tank; and a hardware processor that causes a control section to carry out control for allowing the shut-off valve to be opened or closed. In the closed tank system, the hardware processor causes the control section to inhibit the control for allowing the shut-off valve to be opened when the internal-combustion engine is in operation and the remaining amount of fuel detected by the fuel remaining amount detector exceeds a predetermined threshold.

BRIEF DESCRIPTION OF THE DRAWINGS

The features and advantages provided by one or more embodiments of the invention will become apparent from the detailed description given below and appended drawings which are given by way of illustration only, and thus are not intended as a definition of the limits of the present invention.

DETAILED DESCRIPTION OF THE PREFERRED EMBODIMENTS

Hereinafter, one or more embodiments of the present invention will be described with reference to the drawings. However, the scope of the invention is not limited to the disclosed embodiments.

A closed tank system according to an embodiment of the present invention will be hereinafter described in detail with reference to the drawings as appropriate.

<Outline of a Closed Tank System 11 According to an Embodiment of the Present Invention>

First, outline of the closed tank system 11 according to the embodiment of the present invention will be described with reference to the drawings, taking the case where the system is applied to a hybrid vehicle (hereinafter referred to as a "vehicle") that is provided with an engine (internal-combustion engine: not shown) and a motor (not shown) as driving sources, as an example.

Note that in the figures described below, the same member or corresponding member is given the same reference sign. Moreover, sizes and shapes of the members are schematically shown in a deformed or exaggerated form in some cases, for convenience of explanation.

Figure 1:
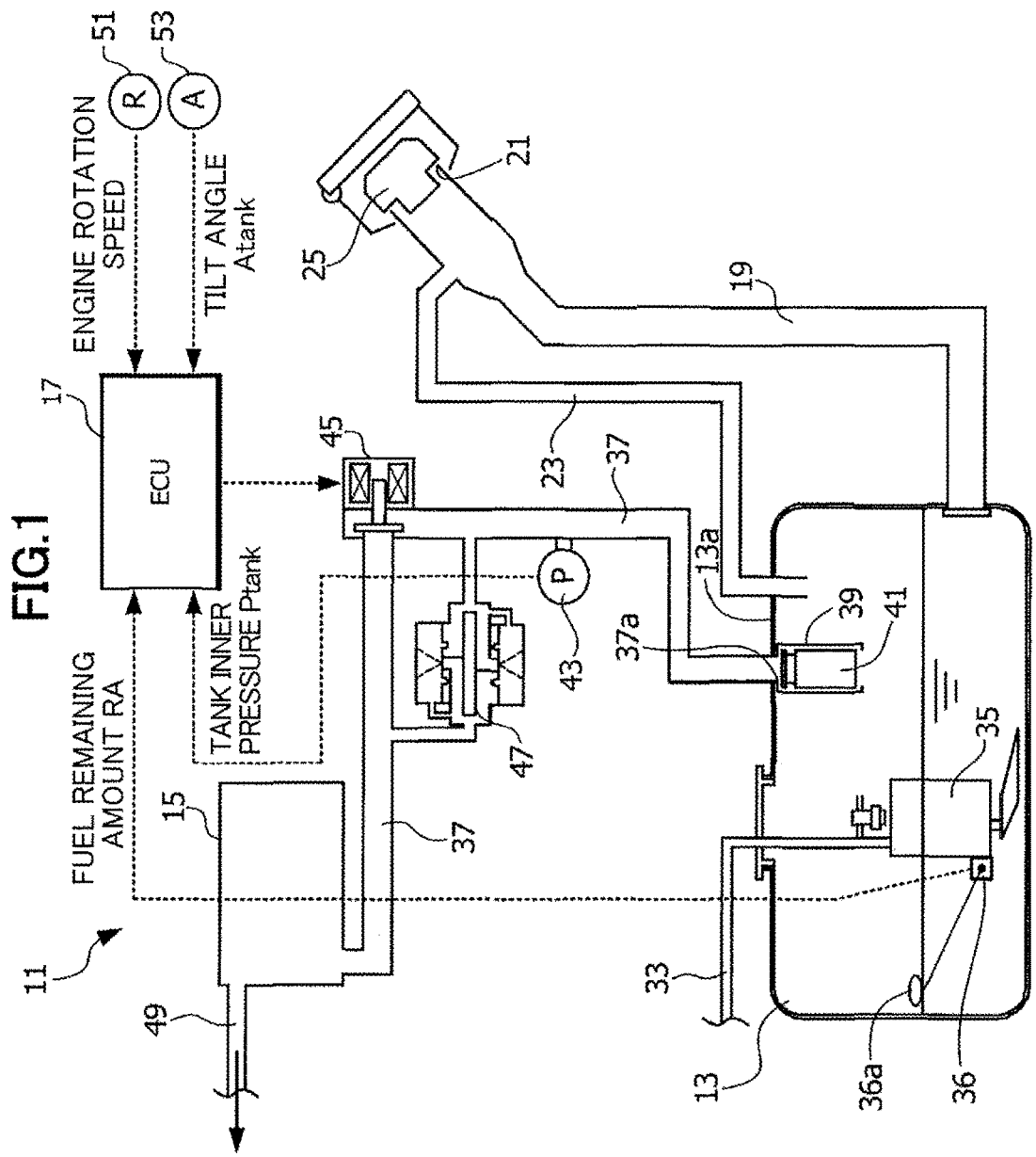
FIG. 1 is a diagram showing an entire configuration of a closed tank system according to an embodiment of the present invention.

FIG. 1 is a diagram showing an entire configuration of the closed tank system 11 according to the embodiment of the present invention.

As shown in FIG. 1, the closed tank system 11 according to the embodiment of the present invention includes a fuel tank 13, a canister 15, and an ECU (Electronic Control Unit) 17 which is a hardware processor configured to carry out integrated control for the closed tank system 11.

The fuel tank 13 has a function to store fuel such as gasoline to be supplied to the engine mounted on the vehicle. The fuel tank 13 has a fuel inlet pipe 19 provided thereon. The fuel inlet pipe 19 has a circulation pipe 23 provided thereon, which is connected between the vicinity of a fuel filler opening 21 and the fuel tank 13. The fuel filler opening 21 has a screw-cap type filler cap 25 attached thereto.

The fuel tank 13 has a fuel pump module 35 provided in a chamber thereof. The fuel pump module 35 has functions to pump up the fuel stored in the fuel tank 13 to send it via a fuel supply passage 33 to an injector (not shown). The fuel pump module 35 has a fuel remaining amount sensor 36 (which corresponds to a "fuel remaining amount detector" in the present invention) provided thereon. The fuel remaining amount sensor 36 has a function to detect a fuel remaining amount RA based on a height position of a float 36a that floats on the fuel.

Moreover, the fuel tank 13 has an evaporative fuel discharge passage 37 (which corresponds to a "communication passage" in the present invention) provided thereon, which is connected between the fuel tank 13 and the canister 15.

The fuel tank 13 has a fill-up limiting valve 39 provided in the chamber thereof, which is mounted on the fuel tank 13 so as to face an opening section 37a of the evaporative fuel discharge passage 37. The fill-up limiting valve 39 operates to close the opening section 37a when the chamber of the fuel tank 13 is filled up with fuel. More specifically, the fill-up limiting valve 39 is adapted to close the opening section 37a by allowing a float 41 to float on the fuel when the fuel level reaches a predetermined full tank liquid level RA_full (see FIG. 4). This prevents the fuel in the fuel tank 13 from entering the evaporative fuel discharge passage 37 when the fuel tank 13 is filled up, or when the vehicle is tilted.

The evaporative fuel discharge passage 37 has a tank internal pressure sensor 43, a shut-off valve 45, and a high pressure two-way valve 47 provided thereon, respectively.

The tank internal pressure sensor 43 has a function to detect a tank internal pressure Ptank which is a pressure of vapor phase in the chamber of the fuel tank 13. The tank internal pressure sensor 43 is provided between the fuel tank 13 and the shut-off valve 45 on the evaporative fuel discharge passage 37. Note that a configuration may be adopted such that the tank internal pressure sensor 43 is provided directly on the fuel tank 13. Information on the tank internal pressure Ptank detected by the tank internal pressure sensor 43 is sent to the ECU 17.

The shut-off valve 45 has a function to open or close the evaporative fuel discharge passage 37. The shut-off valve 45 is provided between the fuel tank 13 and the canister 15 on the evaporative fuel discharge passage 37. The shut-off valve 45 is a normally-closed type electromagnetic valve that carries out opening and closing operation in response to an opening/closing control signal which is sent from the ECU 17. More specifically, the shut-off valve 45 responds to the opening/closing control signal to operate to allow the evaporative fuel discharge passage 37 to be opened or closed.

The high pressure two-way valve 47 has a function to regulate a flow direction of the evaporative fuel based on a difference in pressure between a pressure on the fuel tank 13 side and a pressure on the canister 15 side. More specifically, the high pressure two-way valve 47 is provided in parallel with the shut-off valve 45 on the evaporative fuel discharge passage 37, and is a mechanical valve having a diaphragm type positive pressure valve and negative pressure valve combined together.

The canister 15 has a function to adsorb the evaporative fuel generated in the fuel tank 13. In order to realize the function, the canister 15 includes an adsorbent (not shown) consisting of activated carbon for adsorbing the evaporative fuel. The adsorbent of the canister 15 adsorbs the evaporative fuel which is sent from the fuel tank 13 side through the evaporative fuel discharge passage 37. The canister 15 is connected via a purging passage 49 to an intake manifold (not shown).

<Configuration of the ECU 17 and its Periphery>

Figure 2:
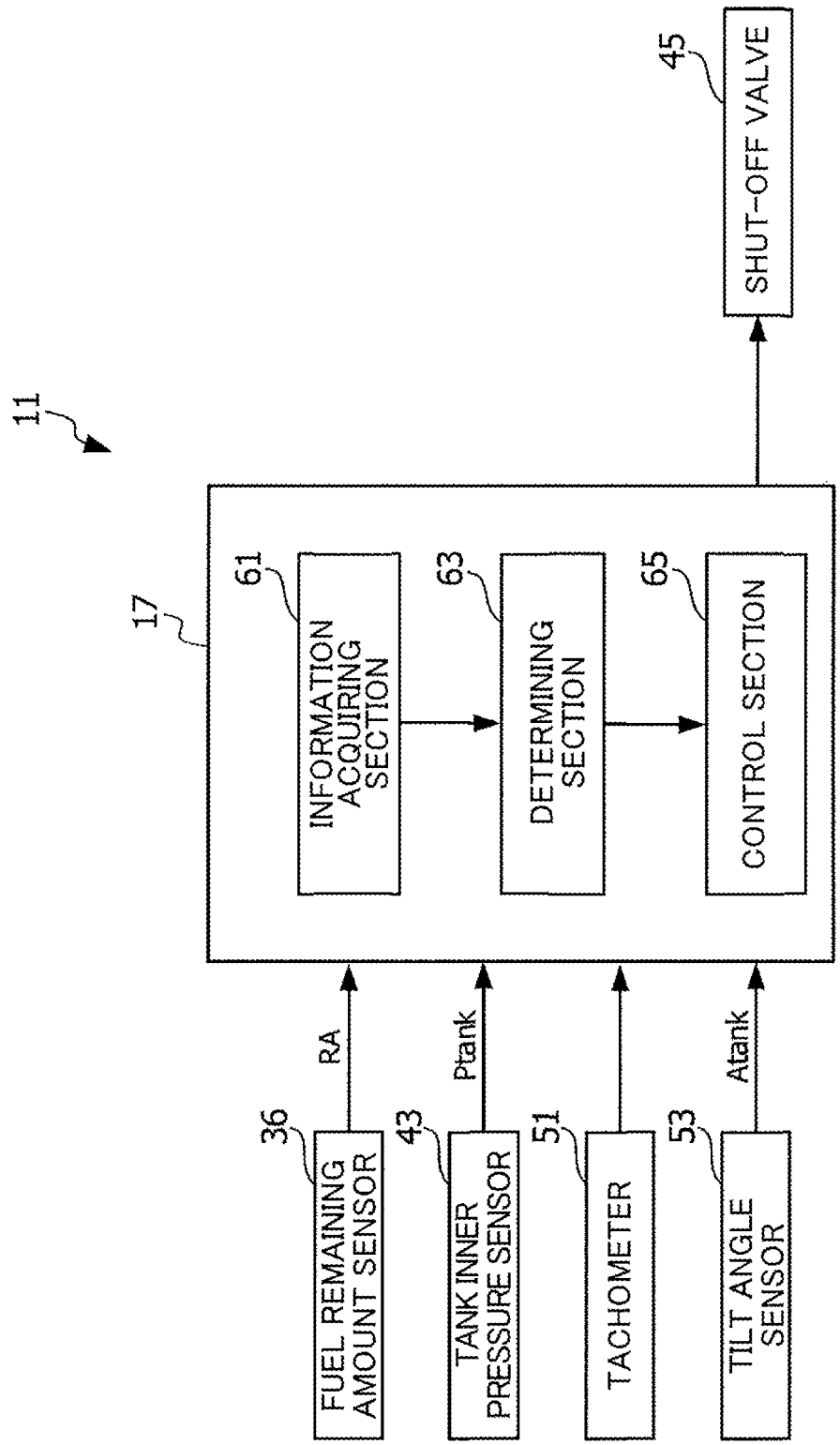
FIG. 2 is a block diagram showing a configuration of an ECU and its periphery.

Next, configuration of the ECU 17 and its periphery will be described with reference to FIG. 2. FIG. 2 is a block diagram showing the configuration of the ECU 17 and its periphery.

The ECU 17 functioning as the hardware processor in the present invention is provided in a luggage room in the rear part of the vehicle. As shown in FIG. 1 and FIG. 2, the ECU 17 has, as its input system, the fuel remaining amount sensor 36 and the tank internal pressure sensor 43 described above, a tachometer 51, and a tilt angle sensor 53 connected thereto, respectively. The tachometer 51 has a function to detect an engine rotation speed. The tilt angle sensor 53 has a function to detect a tilt angle Atank of the own vehicle relative to a horizontal plane. Information on the engine rotation speed detected by the tachometer 51 and the tilt angle Atank of the own vehicle detected by the tilt angle sensor 53 is sent to the ECU 17.

Moreover, as shown in FIG. 1 and FIG. 2, the ECU 17 has, as its output system, the shut-off valve 45 described above connected thereto.

As shown in FIG. 2, the ECU 17 includes an information acquiring section 61, a determining section 63, and a control section 65.

The ECU 17 is constituted by a microcomputer that includes a CPU (Central Processing Unit), a ROM (Read Only Memory), a RAM (Random Access Memory) and the like. The microcomputer operates to read out and execute programs and data stored in the ROM, and to perform execution control related to various functions which the ECU 17 has, including functions associated with various pieces of information, a determining function to be described later, and a function of integrated control for the closed tank system 11.

The information acquiring section 61 has a function to acquire information on the fuel remaining amount RA detected by the fuel remaining amount sensor 36, the tank internal pressure Ptank detected by the tank internal pressure sensor 43, the engine rotation speed detected by the tachometer 51, and the tilt angle Atank of the own vehicle detected by the tilt angle sensor 53, respectively.

The determining section 63 is adapted to determine whether or not the engine is in operation, based on the engine rotation speed acquired by the information acquiring section 61.

Moreover, the determining section 63 is adapted to determine whether or not the tank internal pressure Ptank acquired by the information acquiring section 61 exceeds a tank internal pressure threshold Ptank_th which is preset. The tank internal pressure threshold Ptank_th is set to a suitable pressure value based on withstand pressure characteristics of the fuel tank 13.

Figure 4:
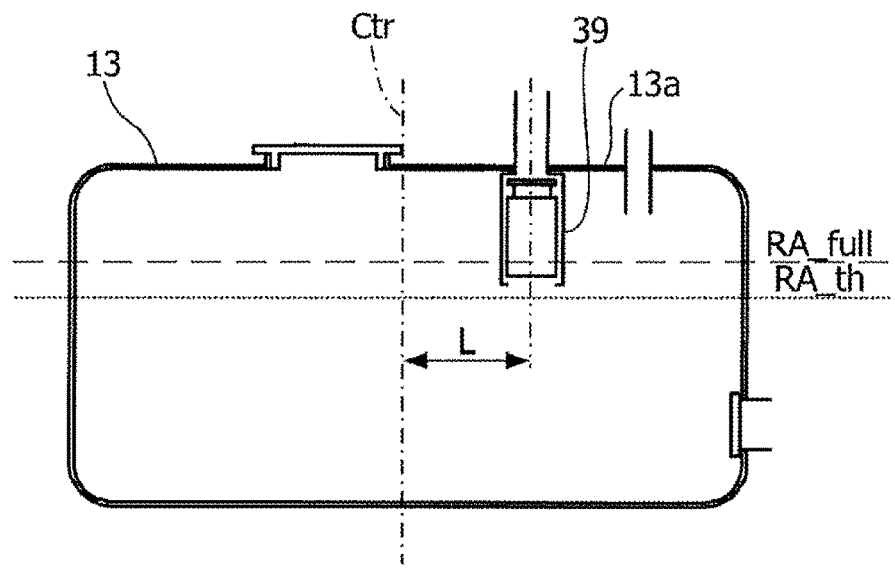
FIG. 4 is a diagram for explaining an operation of the closed tank system according to the embodiment of the present invention.

Moreover, the determining section 63 is adapted to determine whether or not the fuel remaining amount RA acquired by the information acquiring section 61 exceeds a fuel remaining amount threshold RA_th which is preset. As shown in FIG. 4, the fuel remaining amount threshold RA_th is set to a value which is a little lower than the full tank liquid level RA_full. Note that the fuel remaining amount threshold RA_th may be set to the same value as the full tank liquid level RA_full.

Furthermore, the determining section 63 is adapted to determine whether or not the tilt angle Atank of the own vehicle acquired by the information acquiring section 61 exceeds a tilt angle threshold Atank_th which is preset. The tilt angle threshold Atank_th (see FIG. 5) is set to a suitable angle value at which the fill-up limiting valve 39, which has been wetted with the fuel when the tilt angle Atank of the own vehicle is zero (i.e., the tank is in a horizontal state), is brought into a state not wetted with the fuel. Note that the tilt angle Atank of the own vehicle is synonymous with a tilt angle of the fuel tank 13.

Figure 5:
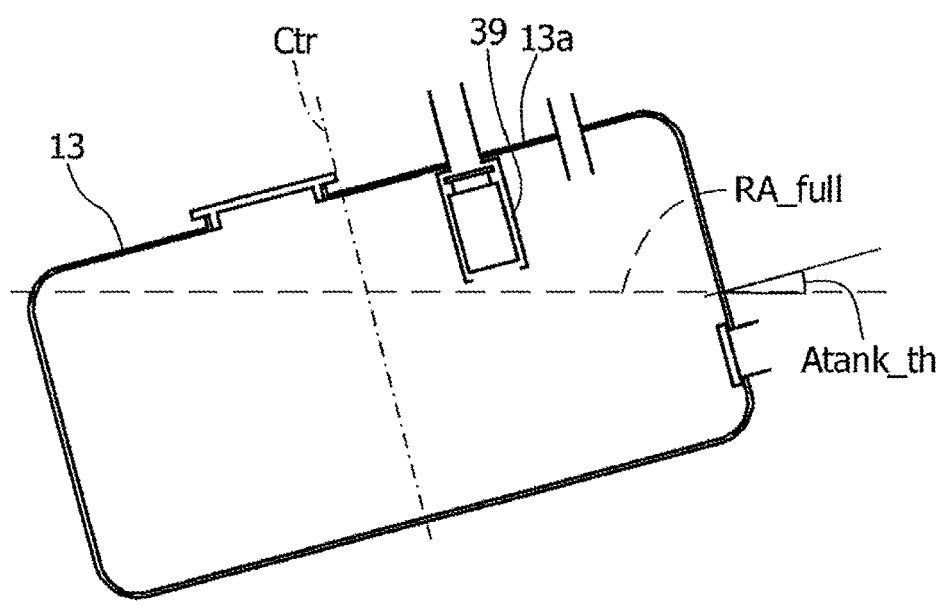
FIG. 5 is a diagram for explaining the operation of the closed tank system according to the embodiment of the present invention.

Also, the event in which the fill-up limiting valve 39, which has been wetted with the fuel when the tilt angle Atank of the own vehicle is zero (the tank is in the horizontal state), is brought into a state not wetted with the fuel, happens in the direction of tilt of the own vehicle (the fuel tank 13), namely in a direction of the fill-up limiting valve 39 getting away from the fuel level when the tank tilts (in the examples shown in FIG. 4 and FIG. 5, the direction of tilt of the fuel tank 13 is a counterclockwise direction). Therefore, when the tilt angle threshold Atank_th is set, full consideration is given to orientation of offset related to a mounting position of the fill-up limiting valve 39 relative to a central part Ctr of a top plate 13a of the fuel tank 13.

Moreover, the tilt angle threshold Atank_th is set to be smaller as an offset length L (see FIG. 4) related to the mounting position of the fill-up limiting valve 39 relative to the central part Ctr of the top plate 13a of the fuel tank 13 becomes longer. That is, the tilt angle threshold $Atank_{th}$ has an inverse correlation with the offset length L.

The control section 65 is adapted to generally carry out control for allowing the shut-off valve 45 to be opened when the engine is in operation and the tank internal pressure Ptank exceeds the tank internal pressure threshold Ptank_th. Note that the control section 65 is adapted to carry out control for inhibiting the opening of the shut-off valve 45 when the fuel remaining amount RA exceeds the fuel remaining amount threshold RA_th and the tilt angle Atank of the own vehicle is equal to or smaller than the tilt angle threshold Atank_th.

<Operation of the Closed Tank System 11 According to the Embodiment of the Present Invention>

Next, operation of the closed tank system 11 according to the embodiment of the present invention will be described with reference to FIG. 3 to FIG. 5.

Figure 3:
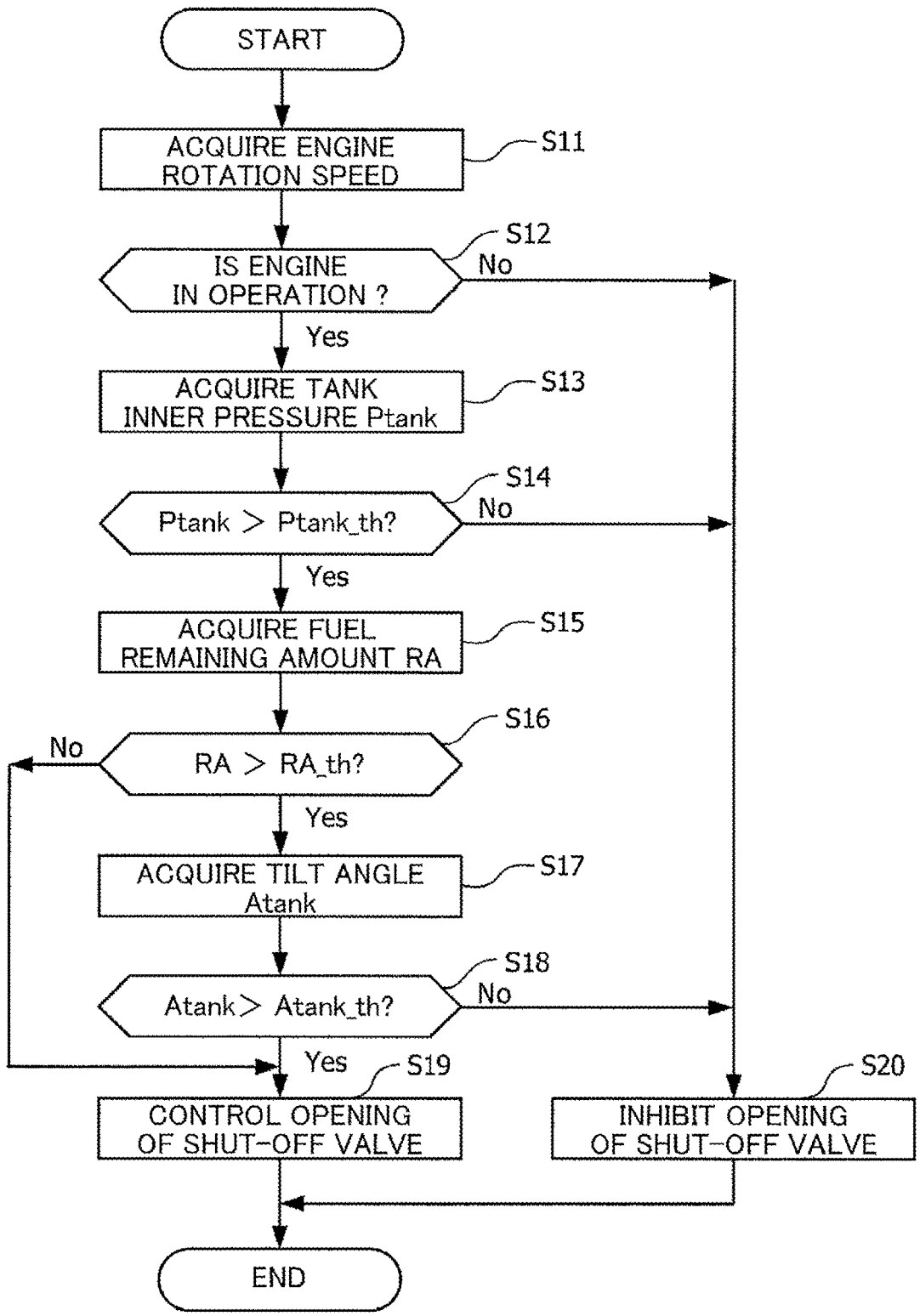
FIG. 3 is a flowchart representing a processing flow of opening and closing control for a shut-off valve, which is executed by the closed tank system according to the embodiment of the present invention.

FIG. 3 is a flowchart representing a processing flow of opening and closing control for the shut-off valve, which is executed by the closed tank system. 11 according to the embodiment of the present invention. FIG. 4 and FIG. 5 are diagrams for explaining the operation of the closed tank system 11.

In step S11 shown in FIG. 3, the information acquiring section 61 of the ECU 17 acquires information on the engine rotation speed detected by the tachometer 51.

In step S12, the determining section 63 determines whether or not the engine is in operation, based on the engine rotation speed acquired by the information acquiring section 61. As a result of the determination in step S12, when determination that the engine is not in operation is made ("No" in step S12), the ECU 17 allows the processing flow to proceed to step S20 to be described later. On the other hand, as a result of the determination in step S12, when determination that the engine is in operation is made ("Yes" in step S12), the ECU 17 allows the processing flow to proceed to step S13.

In step S13, the information acquiring section 61 acquires information on the tank internal pressure Ptank detected by the tank internal pressure sensor 43.

In step S14, the determining section 63 determines whether or not the tank internal pressure Ptank acquired by the information acquiring section 61 exceeds the tank internal pressure threshold Ptank_th. As a result of the determination in step S14, when determination that the tank internal pressure Ptank does not exceed the tank internal pressure threshold Ptank_th is made ("No" in step S14), the ECU 17 allows the processing flow to proceed to step S20 to be described later. On the other hand, as a result of the determination in step S14, when determination that the tank internal pressure Ptank exceeds the tank internal pressure threshold Ptank_th is made ("Yes" in step S14), the ECU 17 allows the processing flow to proceed to step S15.

In step S15, the information acquiring section 61 acquires information on the fuel remaining amount RA detected by the fuel remaining amount sensor 36.

In step S16, the determining section 63 determines whether or not the fuel remaining amount RA acquired by the information acquiring section 61 exceeds the fuel remaining amount threshold RA_th. As a result of the determination in step S16, when determination that the fuel remaining amount RA does not exceed the fuel remaining amount threshold RA_th is made ("No" in step S16), the ECU 17 allows the processing flow to proceed to step S19 to be described later. On the other hand, as a result of the determination in step S16, when determination that the fuel remaining amount RA exceeds the fuel remaining amount threshold RA_th is made ("Yes" in step S16), the ECU 17 allows the processing flow to proceed to step S17.

In step S17, the information acquiring section 61 acquires information on the tilt angle Atank of the own vehicle detected by the tilt angle sensor 53.

In step S18, the determining section 63 determines whether or not the tilt angle Atank of the own vehicle acquired by the information acquiring section 61 exceeds the tilt angle threshold Atank_th. As a result of the determination in step S18, when determination that the tilt angle Atank of the own vehicle does not exceed the tilt angle threshold Atank_th is made ("No" in step S18), the ECU 17 allows the processing flow to proceed to step S20 to be described later. On the other hand, as a result of the determination in step S18, when determination that the tilt angle Atank of the own vehicle exceeds the tilt angle threshold Atank_th is made ("Yes" in step S18), the ECU 17 allows the processing flow to proceed to step S19.

In step S19, the control section 65 generally carries out the control for allowing the shut-off valve 45 to be opened when the engine is in operation and the tank internal pressure Ptank exceeds the tank internal pressure threshold Ptank_th.

In step S20, the control section 65 carries out the control for inhibiting the opening of the shut-off valve 45 when the engine is not in operation, when the tank internal pressure Ptank does not exceed the tank internal pressure threshold Ptank_th, or when the engine is in operation and the tank internal pressure Ptank exceeds the tank internal pressure threshold Ptank_th; the fuel remaining amount RA exceeds the fuel remaining amount threshold RA_th; and the tilt angle Atank of the own vehicle is equal to or smaller than the tilt angle threshold Atank_th.

In brief, when the fill-up limiting valve 39 is wetted with the fuel even in the case where the engine is in operation and the tank internal pressure Ptank exceeds the tank internal pressure threshold Ptank_th, the control section 65 assumes that there is a risk that opening the shut-off valve 45 causes the fuel in liquid form to be sucked out of the fuel tank 13 through the fill-up limiting valve 39 to the evaporative fuel discharge passage 37 and to reach the canister 15 through the shut-off valve 45, and carries out the control for inhibiting the opening of the shut-off valve 45.

<Effects of the Closed Tank System 11 According to the Embodiment of the Present Invention>

Next, description will be given of effects of the closed tank system 11 according to the embodiment of the present invention.

The closed tank system 11 based on a first aspect (which corresponds to claim 1) according to the embodiment of the present invention includes: the fuel tank 13 adapted to store fuel to be supplied to the engine (internal-combustion engine) mounted on the vehicle; the canister 15 connected via the evaporative fuel discharge passage (communication passage) 37 to the fuel tank 13 and adapted to adsorb evaporative fuel generated in the fuel tank 13; the fill-up limiting valve 39 provided in the chamber of the fuel tank 13 so as to be communicated with the evaporative fuel discharge passage 37 and adapted to operate to close the evaporative fuel discharge passage 37 by allowing the float 41 to float on the fuel when the fuel level reaches the predetermined full tank liquid level RA_full; the shut-off valve 45 that is provided on the downstream side of the fill-up limiting valve 39 in the evaporative fuel discharge passage 37 when seen from the fuel tank 13 and adapted to operate to open or close the evaporative fuel discharge passage 37; the fuel remaining amount sensor (fuel remaining amount detector) 36 that is adapted to detect the fuel remaining amount RA stored in the fuel tank 13; and the hardware processor that causes the control section 65 to carryout control for allowing the shut-off valve 45 to be opened or closed.

In the closed tank system 11 based on the first aspect, the hardware processor causes the control section 65 to inhibit the control for allowing the shut-off valve 45 to be opened when the engine is in operation and the fuel remaining amount RA detected by the fuel remaining amount sensor 36 exceeds the predetermined fuel remaining amount threshold RA_th.

According to the closed tank system 11 based on the first aspect, the hardware processor causes the control section 65 to inhibit the control for allowing the shut-off valve 45 to be opened when the engine is in operation and the fuel remaining amount RA detected by the fuel remaining amount sensor 36 exceeds the predetermined fuel remaining amount threshold RA_th, thus making it possible to prevent fuel in liquid form from reaching the canister 15 through the shut-off valve 45.

The closed tank system 11 based on a second aspect (which corresponds to claim 2) according to the embodiment of the present invention is the closed tank system 11 based on the first aspect, in which the fill-up limiting valve 39 is disposed to be offset for the central part Ctr of the fuel tank 13 in planar view, and the hardware processor further includes the determining section 63 adapted to determine whether or not the fill-up limiting valve 39 is wetted with the fuel, and in which the hardware processor causes the control section 65 to carry out the control for allowing the shut-off valve 45 to be opened when the determining section 63 makes determination that the fill-up limiting valve 39 is not wetted with the fuel, even when the engine is in operation and the fuel remaining amount RA detected by the fuel remaining amount sensor 36 exceeds the predetermined fuel remaining amount threshold RA_th.

According to the closed tank system 11 based on the second aspect, the hardware processor causes the control section 65 to carry out the control for allowing the shut-off valve 45 to be opened when the determining section 63 makes determination that the fill-up limiting valve 39 is not wetted with the fuel, even when the engine is in operation and the fuel remaining amount RA detected by the fuel remaining amount sensor 36 exceeds the predetermined fuel remaining amount threshold RA_th, thus making it possible to reduce chances at which the opening control for the shut-off valve 45 is inhibited, while avoiding a situation in which the fuel in liquid form reaches the canister 15 through the shut-off valve 45, before it happens.

The closed tank system 11 based on a third aspect (which corresponds to claim 3) according to the embodiment of the present invention is the closed tank system 11 based on the second aspect, which further includes the tilt angle sensor (tilt angle detector) 53 adapted to detect the tilt angle Atank of the own vehicle, and in which the hardware processor causes the determining section 63 to make determination that the fill-up limiting valve 39 is not wetted with the fuel when the tilt angle Atank of the own vehicle detected by the tilt angle sensor 53 is equal to or smaller than the tilt angle threshold Atank_th.

According to the closed tank system 11 based on the third aspect, the hardware processor causes the determining section 63 to make determination that the fill-up limiting valve 39 is not wetted with the fuel when the tilt angle Atank of the own vehicle detected by the tilt angle sensor 53 is equal to or smaller than the tilt angle threshold Atank_th, thus making it possible to expect effects of easily determining with high accuracy whether or not the fill-up limiting valve 39 is wetted with the fuel.

<Other Embodiments>

The embodiments described above show examples for realization of the present invention. Therefore, the technical scope of the present invention should not be interpreted to a limited extent, because the present invention can be put into practice in various forms without departing from the gist thereof or principal features thereof.

For example, although the embodiment according to the present invention has been described, by way of example, taking the case where whether or not the fill-up limiting valve 39 is wetted with the fuel is determined in accordance with whether or not the tilt angle Atank of the own vehicle detected by the tilt angle sensor 53 is equal to or smaller than the tilt angle threshold Atank_th, the present invention is not limited to this example. As long as determination of whether or not the fill-up limiting valve 39 is wetted with the fuel can be made, any configuration may be adopted.

Although embodiments of the present invention have been described and illustrated in detail, the disclosed embodiments are made for purposes of illustration and example only and not limitation. The scope of the present invention should be interpreted by terms of the appended claims.

DESCRIPTION OF REFERENCE SIGNS

11: Closed tank system; 13: Fuel tank; 15: Canister; 36: Fuel remaining amount sensor (Fuel remaining amount detector); 37: Evaporative fuel discharge passage (Communication passage); 39: Fill-up limiting valve; 41: Float of the fill-up limiting valve; 45: Shut-off valve; 53: Tilt angle sensor (Tilt angle detector); 63: Determining section; 65: Control section

What is claimed is:

1. A control method for a closed tank system, the closed tank system comprising:
   a fuel tank that is adapted to store fuel to be supplied to an internal-combustion engine mounted on a vehicle;
   a canister that is connected via a communication passage to the fuel tank and adapted to adsorb evaporative fuel generated in the fuel tank;
   a fill-up limiting valve that is provided in a chamber of the fuel tank so as to be communicated with the communication passage and adapted to operate to close the communication passage by allowing a float to float on the fuel when a fuel level reaches a predetermined full tank liquid level;
   a shut-off valve that is provided on a downstream side of the fill-up limiting valve in the communication passage when seen from the fuel tank and adapted to operate to open or close the communication passage;
   a pressure sensor adapted to detect a tank internal pressure of the fuel tank;
   a tilt angle detector adapted to detect a tilt angle of the vehicle;
   a fuel remaining amount detector that is adapted to detect a remaining amount of fuel stored in the fuel tank; and
   a hardware processor having a control section and a determining section,
   wherein the control method comprises:
   determining, using the determining section, whether or not the internal-combustion engine is in operation;
   determining, using the determining section, whether or not the tank internal pressure detected by the pressure sensor exceeds a tank internal pressure threshold;
   determining, using the determining section, whether or not the remaining amount of fuel detected by the fuel remaining amount detector exceeds a fuel remaining amount threshold;
   determining, using the determining section, whether or not the tilt angle of the vehicle detected by the tilt angle detector exceeds a tilt angle threshold; and
   inhibiting, using the control section, control for allowing the shut-off valve to be opened when: it is determined that the internal-combustion engine is in operation; the tank internal pressure detected by the pressure sensor exceeds the tank internal pressure threshold; the remaining amount of fuel detected by the fuel remaining amount detector exceeds the fuel remaining amount threshold; and the tilt angle of the vehicle detected by the tilt angle detector is equal to or smaller than the tilt angle threshold.

2. The control method for the closed tank system, according to claim 1, wherein in the closed tank system, the fill-up limiting valve is disposed to be offset from a central part of the fuel tank in planar view, and
   the control method further comprises, when the tilt angle of the vehicle detected by the tilt angle detector is determined to not exceed the tilt angle threshold, determining, using the determining section, whether the fill-up limiting valve is wetted with the fuel.

3. The control method for the closed tank system, according to claim 2, wherein the control method further comprises carrying out, using the control section, control for allowing the shut-off valve to be opened when it is determined that the fill-up limiting valve is not wetted with the fuel, even when the internal-combustion engine is in operation and the remaining amount of fuel detected by the fuel remaining amount detector exceeds the fuel remaining amount threshold.

4. The control method for the closed tank system, according to claim 3, wherein the control method further comprises determining, using the determining section, that the fill-up limiting valve is not wetted with the fuel when it is determined that the tilt angle of the vehicle detected by the tilt angle detector exceeds the tilt angle threshold.

* * * * *